United States Patent [19]

Mesenich

[11] Patent Number: 5,127,585
[45] Date of Patent: Jul. 7, 1992

[54] ELECTROMAAGNETIC HIGH-PRESSURE INJECTION VALVE

[75] Inventor: Gerhard Mesenich, Bochum, Fed. Rep. of Germany

[73] Assignee: Siemens Aktiengesellschaft, Munich, Fed. Rep. of Germany

[21] Appl. No.: 749,884

[22] Filed: Aug. 26, 1991

Related U.S. Application Data

[63] Continuation of PCT/DE90/00092, Feb. 12, 1990.

[30] Foreign Application Priority Data

Feb. 25, 1989 [DE] Fed. Rep. of Germany ....... 3905992

[51] Int. Cl.⁵ .................................................. F02M 51/06
[52] U.S. Cl. ................................. 239/585.5; 239/585.3
[58] Field of Search ................... 239/585; 251/129.09, 251/129.10, 129.21, 129.07

[56] References Cited

U.S. PATENT DOCUMENTS 4,310,123 1/1982 Tepasite .
4,552,312 11/1985 Ohno et al. .
4,606,502 8/1986 Naschberger .

FOREIGN PATENT DOCUMENTS 0177719 4/1986 European Pat. Off. .
2343243 5/1974 Fed. Rep. of Germany .
8808199 10/1988 World Int. Prop. O. .

Primary Examiner—Andres Kashnikow
Assistant Examiner—Kevin Weldon
Attorney, Agent, or Firm—Herbert L. Lerner; Laurence A. Greenberg

[57] ABSTRACT

An electromagnetic high-pressure injection valve is used in the direct injection of fuel into the combustion chamber of internal combustion engines. The magnetic valve has a miniaturized magnetic circuit in which the necessary actuating forces are reduced by means of a particularly small seat diameter and a small stop surface for the valve needle, in comparision with prior art constructions. Fuel under high pressure streams completely around the moving parts of the valve. An adjustable seat base is also provided which provides high long-term calibration stability, despite its small size. In order to reduce closing rebound, a vibration damping system may also be used in mechanical injection systems. In order to attain the fastest adjustments, the valve may be fitted with a polarized magnetic circuit having a special feature which is its suspension inside two diaphragm springs with a very steep elasticity characteristic.

17 Claims, 4 Drawing Sheets

ELECTROMAAGNETIC HIGH-PRESSURE INJECTION VALVE

CROSS-REFERENCE TO RELATED APPLICATION

This application is a continuation of International application Ser. No. 01/000,092, filed Feb. 12, 1990.

BACKGROUND OF THE INVENTION

1. Field of the Invention

The invention relates to an electromagnetic high-pressure injection valve for injection of fuel into the combustion chamber of internal combustion engines.

The injection valve is intended principally for use in small and medium-sized diesel engines with a displacement of 300 cm$^3$ to 700 cm$^3$ per cylinder. The typical flow rate of the valve is 10-25 mm$^3$/ms. The injection valve can be used up to a fuel pressure of about 1000 bar. The valve has a needle-shaped valve-closing body which is connected to the armature of an electromagnet. As in the known low-pressure injection valves, the fuel feed to the injection nozzle is enabled when the armature is attracted. The injection valve is supplied with fuel by a high-pressure piston pump that is mechanically driven by the engine.

2. Description of the Related Art

In diesel engines, very high injection pressures of up to 1000 bar and above are aimed for in order to improve fuel preparation and to reduce the formation of pollutants. In general, a steep injection curve at the beginning of injection and a sharply delimited end to injection are demanded. The beginning and duration of injection must be matched to the conditions of the engine characteristic diagram.

Injection systems which are purely mechanical in operation are generally used for high-pressure injection. In this case the fuel is compressed at the beginning of the injection process in a pump element and the pump energy is transmitted as a pressure wave to the injection nozzle. The injection nozzle is provided with a nozzle needle which is lifted from the valve seat by the fuel pressure, counter to the force of a spring. In the case of small injection nozzles for vehicle engines, the mass of the nozzle needle is about 5-10 g. The return force of the spring is between 400 and 2000N, depending on the opening pressure of the nozzle. The seat diameter of the injection valves is in general about 2 mm. Due to the high return force and the relatively large mass of the nozzle needle, the valve seat is exposed to high impact loading upon closure of the valve.

During and after the injection process, powerful pressure waves are reflected between the pump and the nozzle. The amplitude of these waves can be up to several hundred bar. Given the pressure waves, touching of the zero line, during which the vapor pressure of the fuel is undershot, may occur after the closing of the injection nozzle. This leads to cavitation on the elements of the injection system, with high, shock-like loads. The reflected pressure waves can furthermore trigger a renewed needle opening process. During that process, an after-dribble delayed by the propagation time of the pressure wave occurs, during which the fuel is only inadequately atomized and only incompletely takes part in combustion. An additional after-dribble occurs due to the ever present needle rebound upon closure of the valve.

In the mechanically operating injection systems, the pumping process is rigidly coupled to a certain angle of rotation. High, shock-like mechanical loading of the injection pump occurs since the entire pressure build-up occurs in a very short time within the small angle of rotation. Since the time for passing through this angle becomes shorter and shorter as the engine speed increases, whereas the cross-section of the nozzle holes remains constant, a steep, speed-dependent pressure rise occurs, leading to considerable problems with fuel preparation. At low speeds, the pressure is usually insufficient to raise the nozzle needle completely. In the case of a partially opened needle, most of the fuel pressure is converted to speed in the valve seat and then swirled in the blind hole of the nozzle. Only a low fuel pressure is then available for speed conversion in front of the nozzle holes, resulting in very inadequate atomization.

The engine speed-dependent pressure rise makes it difficult to match the injection nozzle to the requirements of the engine, with the result that in the case of the mechanically operating injection systems, optimum conditions are achieved only in narrowly defined engine speed and load ranges. Injection valves with electromagnetic actuation can be used in order to avoid the problems resulting from the transportation of the fuel by pressure waves. In electromagnetic injection valves, a rapid actuating movement with little rebound is necessary to achieve sufficient accuracy of metering. That can only be achieved with an armature of very low mass with high mechanical rigidity. The attraction and release time should be less than 0.5 ms. The required short attraction time should be achieved with as little electric power as possible. The adaptation of the electromagnetic injection valves to the conditions of the engine characteristic diagram is simple to achieve with known electronic controls.

The known electromagnetic injection valves for the injection of fuel into the combustion chamber of internal combustion engines require a large magnetic force, which is required for overcoming the hydraulic forces acting on the valve needle. There are enormous difficulties in constructing sufficiently rapid electromagnets which can overcome the high hydraulic forces with tolerable energy expenditure. The known electromagnetic injection valves with a directly actuated valve needle have a very powerful electromagnet, which often has several simultaneously excited magnet coils. In order to achieve sufficiently rapid actuating movements with such an electromagnet, an enormous electric power must be made available for a short period of time. Furthermore, the armatures of such electromagnets are of as thin-walled construction as possible in order to obtain a low armature mass and in order to reduce eddy current formation in the magnet core. Due to the thin-walled construction, the armatures have a tendency toward pronounced mechanical vibrations in the case of rapid actuating movements, triggering unwanted rebound movements and disturbance forces.

An injection valve known from German Published, Non-Prosecuted Application DE-OS 23 43 243, which is provided for two-stroke engines, does not have any limitation for the injection stroke of the needle. That makes very precise control of the starting stroke necessary and the control is to be adjusted by manual means.

SUMMARY OF THE INVENTION

It is accordingly an object of the invention to provide an electromagnetic high-pressure injection valve, which overcomes the hereinafore-mentioned disadvantages of the heretofore-known devices of this general type and which permits sufficiently rapid actuating movements with sufficiently little rebound in combination with low excitation power. The injection valve should permit relatively simple manufacture in comparison with the known constructions of this generic type.

In tests carried out by the applicant, it has surprisingly been found that the required opening work and the required level of magnetic force for a given valve stroke and given flow is virtually independent of the injection pressure. Thus, for a small required flow, only a little opening work is required even at a very high injection pressure and this can be performed with only a very small armature of low mass. However, an unusually small valve seat diameter is required for this purpose. In the injection valve according to the invention, the diameter of the valve seat is preferably 0.5–0.8 mm. Even with such a small seat diameter, the required flow rate for the operation of small diesel engines can be achieved with a small stroke of 0.05–0.15 mm.

With the injection-dimensioning valve according to the invention, the required maximum opening force for a given stroke is dependent solely on the flow demanded. The stroke of the valve should be about 0.05–0.15 mm. The injection valve is adapted to high fuel pressures by appropriate reduction of the outside diameter of the valve seat to as little as 0.4 mm. The maximum opening force is the product of the fuel pressure and the non-pressure-balanced area of the valve seat. The non-pressure-balanced area of the valve seat is always less than 1 mm$^2$.

In the customary high-pressure injection valves, reliable operation is not possible with such a small seat diameter, that is preferably 0.5–0.8 mm. At such a small diameter, the valve seat would rapidly be destroyed because of the high impact loading. A person skilled in the art will therefore initially assume that reliable operation is not possible because of the small seat diameter of the valve according to the invention due to prohibitive wear in the region of the seat. However, due to the small diameter of the valve seat, the maximum uncompensated hydraulic closing force is only about 5–20N. This small hydraulic counterforce can be overcome with only a very small electromagnet. The reliable operation of the injection valve according to the invention is made possible by a force level which is drastically reduced relative to the customary high-pressure injection valves and by a particularly small armature mass of preferably about 1–2 g. Through the use of the low force level and the small armature mass, the impact loading which occurs in the region of the seat is kept within permissible limits.

Fuel under pressure furthermore streams completely around the armature of the injection valve. In contrast to most of the structures proposed heretofore, the armature space is not separated from the system pressure by a narrow needle guide. The streaming of fuel under pressure completely around the armature is absolutely essential in the injection valve according to the invention in order largely to prevent the occurrence of uncompensated disturbance forces.

With the foregoing and other objects in view there is provided, in accordance with the invention, an electromagnetic high-pressure injection valve for direct injection of fuel into a combustion chamber of an internal combustion engine, comprising a central valve axis, an electromagnet having an armature being completely surrounded by fuel under high pressure, a needle-shaped valve-closing body being firmly connected to the armature and having a non-pressure-balanced cross-section, a valve seat, a stop element having a stop surface being intersected by the central valve axis defining a contact area between the armature and the stop surface, the moving parts of the injection valve having a total mass of at most substantially 2.5 g and preferably substantially from 1 to 2.5 g, the valve-closing body being displaceable together with the armature along the central valve axis with a displacement being limited by the valve seat and by the stop element, and both the contact area and the non-pressure-balanced cross-section when the valve-closing body rests on the valve seat each being less than substantially 1 mm$^2$ and preferably substantially from 0.2 to 0.5 mm$^2$.

In accordance with another feature of the invention, there is provided a valve housing, a valve seat base being braced relative to the valve housing, the valve seat base having a thread with a given thread diameter and a collar-shaped deformable region being braced mechanically relative to the valve housing, the valve seat base being screwed to the valve housing to a variable depth for adjusting an armature stroke, and the valve seat base having an encircling groove formed therein with an inside diameter being smaller than the given thread diameter and delimiting the collar-shaped deformable region.

In accordance with a further feature of the invention, there is provided a vibration damper for damping a closing rebound of the valve-closing body being exposed to the full fuel pressure, a return spring exerting a force pressing the valve-closing body onto the valve seat, the valve-closing body having a valve needle, a further vibration damper clasping the the valve needle, an additional spring exerting a force opposed to the force of the return spring for pressing the further vibration damper against the valve needle, the force of the additional spring being a fraction and preferably substantially 10 to 20% of the force of the return spring, and the vibration damper having a mass being a fraction of the mass of the armature and the valve needle.

In accordance with an added feature of the invention, there is provided a permanent magnet having a permanent-magnetic force, a polarized magnetic circuit including the armature for rapid valve actuation with an armature stroke of less than substantially 0.3 mm and preferably substantially 0.1 mm, and at least two springs between which the armature is suspended, the at least two springs having a steep elasticity characteristic and mutually opposed spring forces defining a resulting spring force in respective end positions being opposed to the permanent-magnetic force, and defining a resulting spring force in an intermediate position of the armature being zero and reaching extreme values in respective end positions of the armature.

In accordance with an additional feature of the invention, there is provided a magnet pole, and a non-magnetizable sleeve supporting the magnet pole and radially guiding the armature. In accordance with yet another feature of the invention, there is provided a magnetic circuit having an air gap, a magnet coil in which the air gap is disposed, and the armature being tubular or hat-shaped.

In accordance with yet a further feature of the invention, there is provided at least one diaphragm spring radially guiding the armature.

In accordance with yet an added feature of the invention, the armature has a pole surface, and the valve-closing body has a valve needle with a pin-shaped or spherical stop projecting above the pole surface by substantially from 30 to 100 micrometers.

In accordance with yet an additional feature of the invention, there is provided a valve needle of the valve-closing body, and a vibration damper being supported by the valve needle and disposed between the return spring and the valve needle.

In accordance with a concomitant feature of the invention, there is provided an injection nozzle, the valve-closing body having a valve needle with a pintle projecting through the injection nozzle and having a diameter of substantially from 0.4 to 0.7 mm.

Other features which are considered as characteristic for the invention are set forth in the appended claims. Although the invention is illustrated and described herein as embodied in an electromagnetic high-pressure injection valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
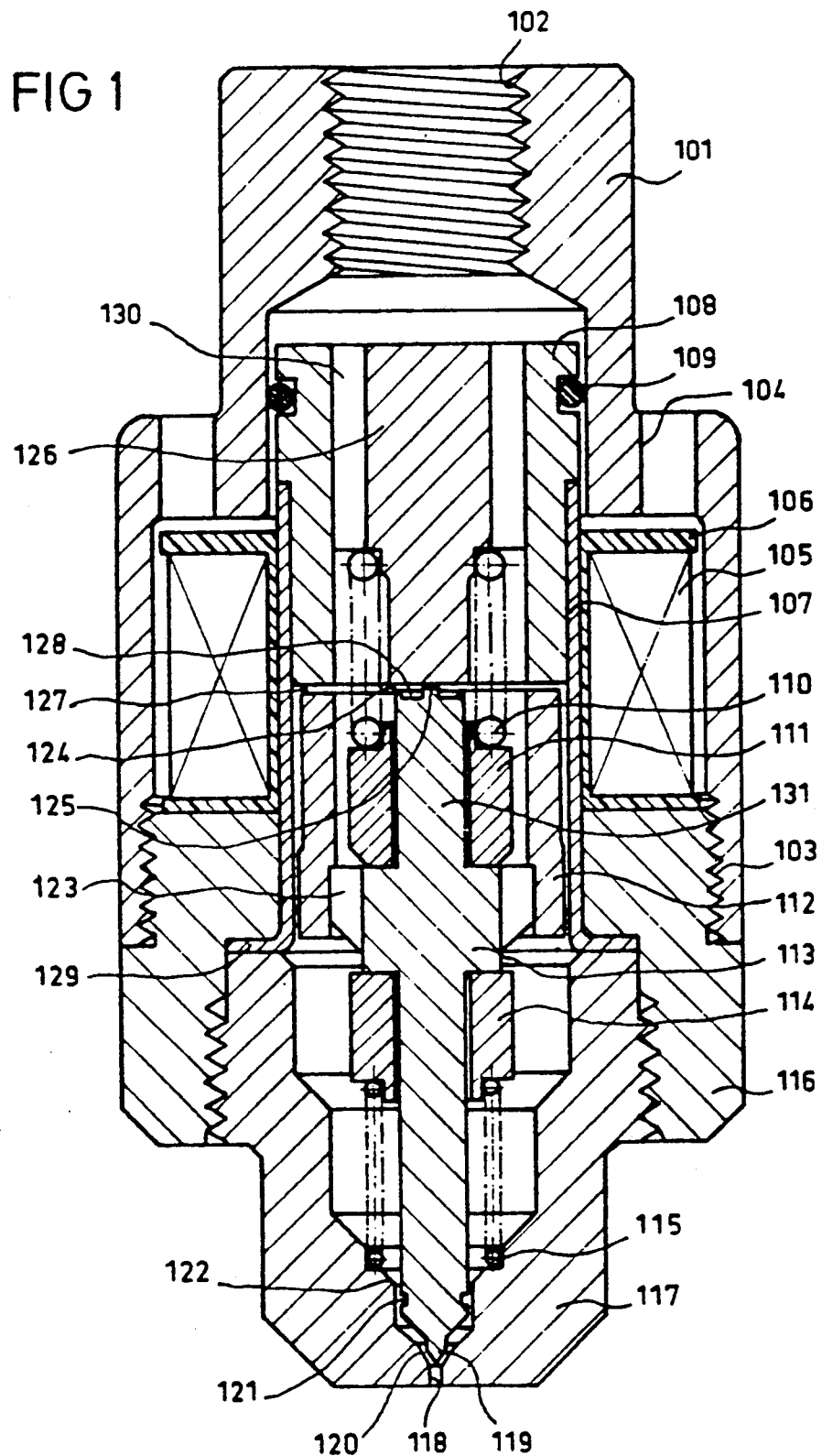
FIG. 1 is a diagrammatic, longitudinal-sectional view of a high-pressure injection valve according to the invention.

Referring now in detail to the figures of the drawing, in connection with which an explanation is given of further necessary and expedient measures which permit reliable operation of the injection valve despite the small magnetic force and first, particularly, to FIG. 1 thereof, there is seen a high-pressure injection valve according to the invention, having an outside diameter which is only about 20 mm. The selected pressure of the valve is about 200–300 bar. The armature stroke of the valve is 0.05–0.1 mm and the outside diameter of the valve seat is 0.8 mm. The magnetic circuit of the valve includes an armature 112, a magnet pole 108, a housing 101 and a support or central housing part 116. All of the parts of the magnetic circuit are formed of soft-magnetic material. The excitation of the magnetic circuit is effected by means of a magnet coil 105, which is wound onto a coil former 106. The magnet coil 105 preferably has about 100 turns. The magnet pole 108 and the armature 112 should be formed of a material with a high saturation induction in order to obtain as high a magnetic force as possible. An iron material with a cobalt content of up to 50% is a highly suitable material. The outside diameter of the armature 112 is preferably about 7–8 mm and the wall thickness is preferably about 1–1.2 mm. The maximum magnetic force of the electromagnet in the case of saturation of the magnet core is about 25–40N.

The tubular armature 112 is pressed onto a valve needle 113, which strikes directly on a stop element 126 with a central stop pin 125. The armature 112 is secured against axial displacement by an additional laser weld or by soldering to the valve needle 113. The return of the armature is effected by a return spring 110, which is disposed inside the armature 112 and the magnet pole 108.

A stop surface of the stop pin 125 projects above the end surface of the armature 112 by about 50 micrometers, with the result that a residual air gap remains between the pole and the armature even when the armature has been attracted. Through the use of the residual air gap, a rapid decay of the magnetic field after switching off the excitation current is achieved. The residual air gap furthermore prevents impermissibly strong damping of the attraction movement of the armature.

Machined into the lower end of the valve needle is a needle-shaped closing body 119 which closes a valve seat 120. The diameter of the needle-shaped closing body 119 is about 2 mm. The conical valve seat 120 and a nozzle 118 are machined directly into a nozzle holder or valve seat base 117. The nozzle 118 is disposed directly below the valve seat 120 without the interposition of an otherwise customary blind hole. A very good quality of flow with a low-turbulence conversion of the fuel pressure is thereby achieved.

The injection valve has hydraulic characteristic adaptation, in which the hydraulic return forces with the armature attracted exceed those with the armature released. With such characteristic adaptation, the return time of the armature is considerably shortened. For this purpose, the lower end of the valve needle 113 is guided with a small radial clearance of a few hundredths of a millimeter within a guide bore 122. The diameter of the guide bore 122 is about 2 mm. Within the annular gap between the valve needle 113 and the guide bore 122 there arises a pressure drop, which increases with increasing flow and therefore with increasing armature stroke. By virtue of this pressure drop, a hydraulic force which increases with increasing armature stroke is produced that is counter to the magnetic force. The radial clearance of the valve needle within the guide bore is dimensioned in such a way that, with the armature attracted, a permanent pressure drop of about 10–20% of the static fuel pressure arises downstream of the annular gap. The diameter of the annular gap should be selected to be about 2–3 times larger than that of the valve seat 120. With the dimensioning given above, hydraulic centering of the closing body and damping of the striking motion of the closing body onto the valve seat is achieved without thereby impermissibly prolonging the return time of the armature. The damping of the return movement drastically reduces the closing rebound. A groove 121 is formed in the valve needle 113. The groove 121 serves to increase the permanent pressure drop and for uniform distribution of the pressure drop over the circumference of the annular gap.

The magnet pole 108 is supported by a non-magnetizable sleeve 107, which has a collar 129 at the lower end. The sleeve 107 is braced with the collar 129 between the support or central housing part 116 and the nozzle holder 117. The valve housing 101 is screwed to the central housing part 116. The magnet pole 108 is preferably secured within the sleeve 107 by pressing in and subsequent laser welding or by hard soldering. The sleeve 107 should be formed of austenitic steel with as high an electrical resistance as possible in order to keep down the formation of eddy currents within the sleeve. The stop element 126 is pressed-in within the magnet pole 108 and is formed of non-magnetizable material.

The stop element 126 is firmly connected to the magnet pole 108 and is provided with lateral grooves 130 which permit the passage of fuel. The end surface of the stop element 126 and that of the magnet pole 108 are situated in a common plane.

The fuel passes into the valve housing through a non-illustrated supply line. The supply line is screwed to the upper housing part 101 at a threaded section 102. From there, the fuel passes through the lateral grooves in the upper stop element 126 and through lateral grooves 123 in the valve needle 113, to the valve seat 120. The magnet pole 108 is sealed off from the housing 101 by a sealing ring 109.

At the beginning of the return of the armature, a hydraulic sticking force arises due to the formation of a vacuum between the stop pin 125 and the stop element 126. The hydraulic sticking force is opposed to the force of the return spring 110 and brings about an unwanted delay of the return of the armature. If the stop surface is too large, this may even result in locking and therefore in an inability of the valve to function. It is therefore absolutely essential to keep the hydraulic sticking force as small as possible. The size of the contact area between the stop pin 125 and the stop element 126 should in no circumstances exceed that of the valve seat. The diameter of the stop pin 125 should therefore be smaller than that of the valve seat. The diameter of the stop pin 125 is preferably 0.5–1 mm. Direct contact between the magnet pole 108 and the armature 112 should furthermore be prevented at all costs in order to prevent hydraulic locking of the armature.

Due to the very small stop surface between the stop pin 125 and the stop element 126, a high impact loading occurs upon impact of the armature. This high impact loading must be limited to permissible values by damping of the attraction movement of the armature. For this purpose, a damping chamber which is machined into the end surface of the valve needle 113 is formed by an encircling pocket 128. The damping chamber is surrounded by a narrow collar 124. The end surface of the encircling narrow collar 124 is set back by about 5–10 micrometers relative to the end surface of the stop pin 125. As a result, a narrow squeeze gap through which the fuel is forced out during the attraction of the armature remains even with the armature attracted. Damping of the striking movement is achieved by means of the squeeze flow. Additional damping is effected by the squeeze flow in the region of a residual air gap 127. By virtue of the measures described above, good damping of the striking movement of the armature is achieved with minimum hydraulic sticking. Without damping measures, stable and low-wear operation of the injection valve would not be possible with the very small area of the stop pin 125. In order to produce the damping chamber and the stop pin 125, the pole surface of the armature 112 is advantageously first ground flat together with the end surface of the valve needle 113. The set-back damping chamber produced by the encircling pocket 128 and the residual air gap are then produced by stamping or by electroerosion of the end surface.

In the case of a very small diameter of the stop pin 125, self-stabilization of the valve is achieved by wear. In the case of wear in the region of the stop surface, the free flow cross-section between the collar 124 and the stop element 126 is reduced. This gives rise to steeply increasing damping forces which dramatically reduce the impact loading when the armature is attracted. Due to the decrease in the impact loading with increasing wear, halting of wear can be achieved after only a short run-in phase. However, the wear results in an increase in the valve stroke and therefore in the flow through the valve. However, given appropriately narrowly toleranced parts, this alteration in the stroke is limited to a few micrometers. Such small alterations in the stroke are tolerable in the injection valve according to the invention.

Disposed between the return spring 110 and the valve needle 113 is a vibration damper 111, which serves for the reduction of the rebound vibrations. The vibration damper 111 is guided in axially mobile fashion with a small radial clearance by a pin-shaped extension 131. In the rest position, the vibration damper 111 is pressed firmly onto a shoulder of the valve needle 113 by the force of the return spring 110. After the impact of the armature, the vibration damper 111 detaches itself from the shoulder of the valve needle due to the inherent kinetic energy, thereby forming a narrow gap in the bearing region. In the process, the valve needle 113 is first of all relieved of the force of the return spring. Furthermore, there arises a very strong hydraulic force in the direction of the opening movement. This force is engendered by the formation of a vacuum within the gap which forms. This force counteracts the rebound vibrations, as a result of which they cease in a very short time. Motion conditions which are exceptionally stable and free of rebound are achieved even in the case of very short opening times, by virtue of the vibration damper 111. In the high-pressure injection valve according to the invention, the mass of the vibration damper is uncritical within wide limits. The dynamically most favorable conditions are achieved when the mass of the vibration damper is about 10% of the mass of the armature and the valve needle.

Disposed below the armature is a further vibration damper 114, which serves for the further damping of the rebound vibrations upon closure of the valve. The vibration damper 114 is pressed against the lower shoulder of the valve needle by a weak spring 115. The force of the spring 115 is considerably smaller than that of the return spring 110. The damping of the closing rebound is accomplished in a manner similar to that in the case of the upper vibration damper. The damping of the closing rebound is achieved by the formation of a vacuum and relief of the spring force in the region of the bearing shoulder of the lower vibration damper 114. A vibration damper of this kind can also be used for reducing the closing rebound in the known mechanical injection nozzles.

The valve can be calibrated in a known manner by selection of matching parts.

The valve is controlled directly with the on-board voltage of about 12 V by known electronic circuits. In this process, over-excitation with a peak current of up to about 10 A is effected up to the end of the attraction process, with the current being reduced in the subsequent holding phase to about 2–3 A. The total attraction times achieved with control in this manner are below 0.5 ms. The attraction time is made up of the attraction delay time and the opening-movement time of the armature. The attraction movement time amounts to about 0.15–0.2 ms. The release time of the valve will generally be about 0.3 ms.

As compared to known valve structures, a large number of advantages are obtained with the structure and dimensioning of the high-pressure injection valve according to the invention:

The valve permits economical manufacture since the guides of the armature and of the valve needle can be produced with comparatively low precision. The magnet pole 108 and the sleeve 107 are almost completely relieved of axial forces. Light and thin-walled construction with little susceptibility to eddy currents is thereby possible. In the known valves, the guide of the valve needle must be produced with exceptionally high precision since this guide serves to seal off the delivery space. These valves furthermore require additional return lines for returning the leakage fuel. In the valve according to the invention, sealing off within the needle guide is not required. The valve has only a few possible leakage paths. It is possible to dispense with return lines.

During the individual actuation processes, only very small pressure oscillations occur, since a relatively large quantity of fuel is stored within the valve. The pressure oscillations are largely absorbed by the elasticity of the quantity of fuel stored in the valve due to the high operating pressure. Furthermore, there is a relatively large cross section available for the supply of fuel. The cross section counteracts the formation of pressure waves. The amplitude of the pressure oscillations decreases with increasing cross section of the fuel supply line. The inside diameter of the fuel supply line should be at least 2-3 mm. The maximum amplitude of the pressure oscillations will in general not exceed about 20-50 bar.

Due to the small pressure oscillations, a high fuel pressure is always present within the valve even in the event of very unfavorable operating conditions. Void formation within the fuel due to pressure waves is completely excluded. There is no risk of touching of the zero line and occurrence of cavitation within the lines. Blow-back of gas from the engine into the valve is not possible because of the continuously present high fuel pressure.

Due to the drastically reduced force level and the low mass of the armature, the valve has a very low requirement for electrical energy, comparatively speaking. The valve has exceptionally small dimensions and permits rapid actuating movements. Movements with little rebound are achieved because of the damping measures. The rebound of the armature will generally come to a halt in less than 0.05-0.1 ms. Even in the event of any closing rebound, the fuel pressure is converted directly in the valve seat to a high speed which always effects complete ejection of the entire metered fuel quantity with good atomization. Even in the event of any after-dribbles, very good atomization is achieved. Due to the very small seat diameter, no significant quantities of fuel are stored below the valve seat.

Figure 2:
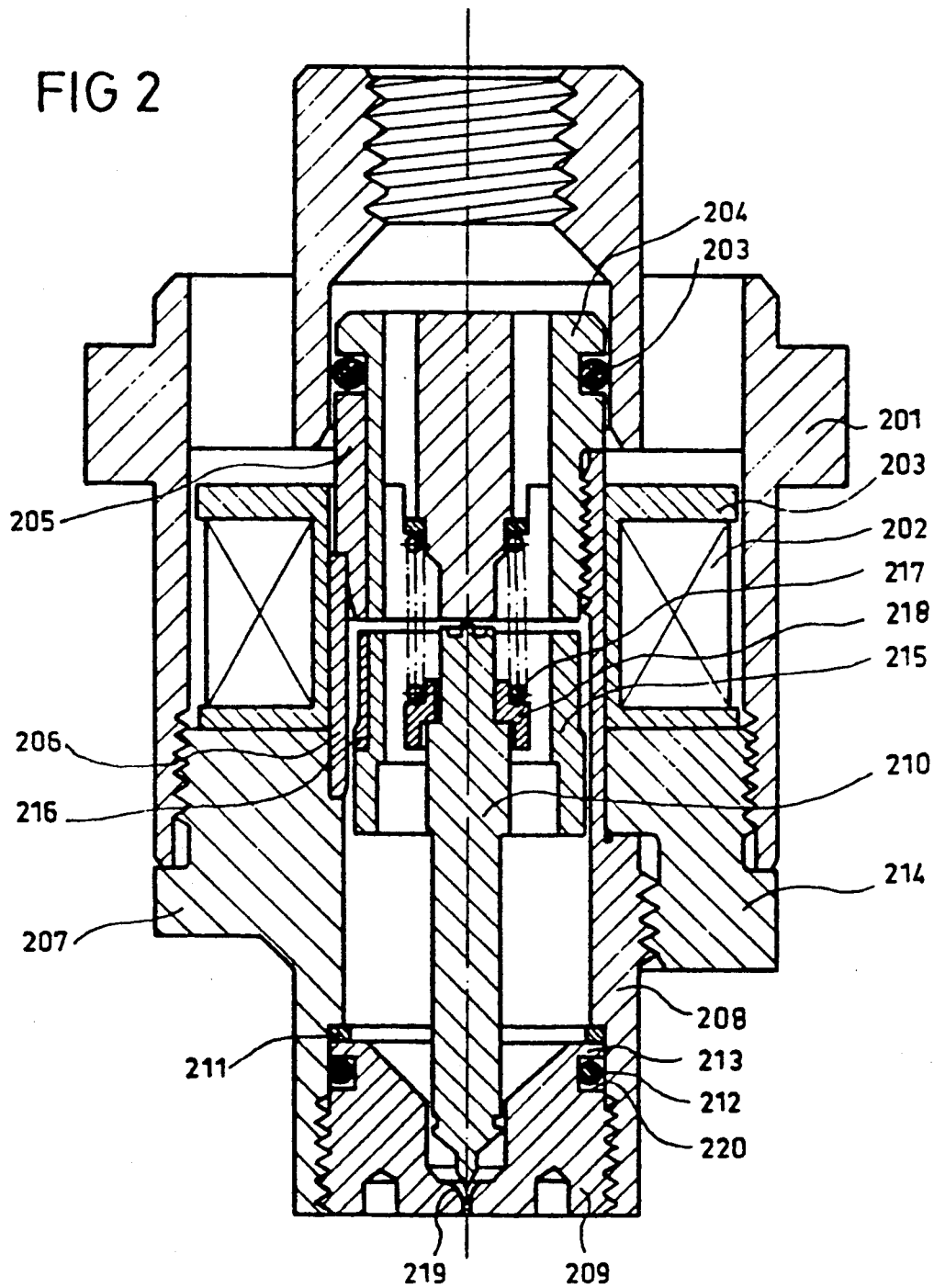
FIG. 2 is a view similar to FIG. 1, showing another embodiment of the valve according to the invention.

Due to the high working speed, a very small partial quantity of the fuel can already be fed to the engine in a separate injection operation at an early point in time. Such a mode of operation is employed for the formation of a lean basic mixture and is referred to as a pilot injection. As is known, it is possible to reduce the ignition delay and the emission of pollutants from diesel engines by means of a pilot injection. Some variants of the valve according to the invention are explained in greater detail below with reference to further illustrative embodiments:

FIG. 2 shows a further high-pressure injection valve of similar construction to that according to FIG. 1. Two slightly different embodiments are depicted in this case on the right-hand side and left-hand side. Various possibilities for securing the magnet pole and a particularly advantageous embodiment for the adjustment of the armature stroke are explained below. Only those details which differ from FIG. 1 are discussed herein.

The magnetic circuit of the valve includes a magnet pole 204, a housing 201 and an armature 215. The magnetic return path is furthermore effected on the right-hand side of FIG. 2 by a support 214, which is screwed to a supporting sleeve 208. The magnet pole 204 is screwed directly to the non-magnetizable supporting sleeve 208. On the left-hand side of FIG. 2, the pole 204 is supported by a non-magnetizable sleeve 206 which is secured within a lower supporting sleeve 207 of magnetizable material. The fixing is preferably effected in this case by hard soldering or by a laser weld. The machining of the end surface of the magnet pole 204 and of a guide bore for the armature 215 can be effected together in one set-up, so that the maintenance of an exact position at right angles is thereby easily possible. The pole 204 and the armature 215 on the left-hand side of FIG. 2 each furthermore include two concentric parts. In this configuration, the armature 215 supports a sleeve 216 and the pole 204 supports the sleeve 206. The advantage of such an embodiment lies in reduced formation of eddy currents since the individual parts can be of thinner-walled construction overall.

The armature stroke is adjusted by rotating a seat base 209. For this purpose, the seat base 209 is braced without play relative to a valve neck of the supporting sleeve 208. Bracing is effected by spring action of a shoulder or collar-shaped deformable region 213 above an encircling sealing-ring groove 220 in which a sealing ring 212 is disposed. Through the use of the braceable seat base 209, a high bracing force is achieved with a particularly small overall size of the valve. Disposed between the shoulder 213 and the shoulder of the valve neck is a gauge ring 211. The gauge ring 211 serves for the coarse adjustment of the valve stroke. Fine calibration is then carried out after a test run of the valve by appropriate rotation of the seat base 209. Alternatively, it is also possible for a braceable shoulder to be disposed at the outer periphery of the seat base. This shoulder is then brought to rest on the end of the neck of the supporting sleeve 208. The necessary springiness is then likewise achieved by means of an undercut groove within the seat base. The braceable seat base 209 permits particularly simple and reliable static calibration of the valve. The necessary long-term stability of the adjustment would not be reliably guaranteed with a separate spring element. The braceable seat base can also be used to advantage in low-pressure injection valves.

FIG. 2 also shows a valve needle 210, a magnet coil 202, a coil former 203, a spring 217, a sealing ring 203', a valve seat 219, a sleeve 205 and a collar 218.

Figure 3:
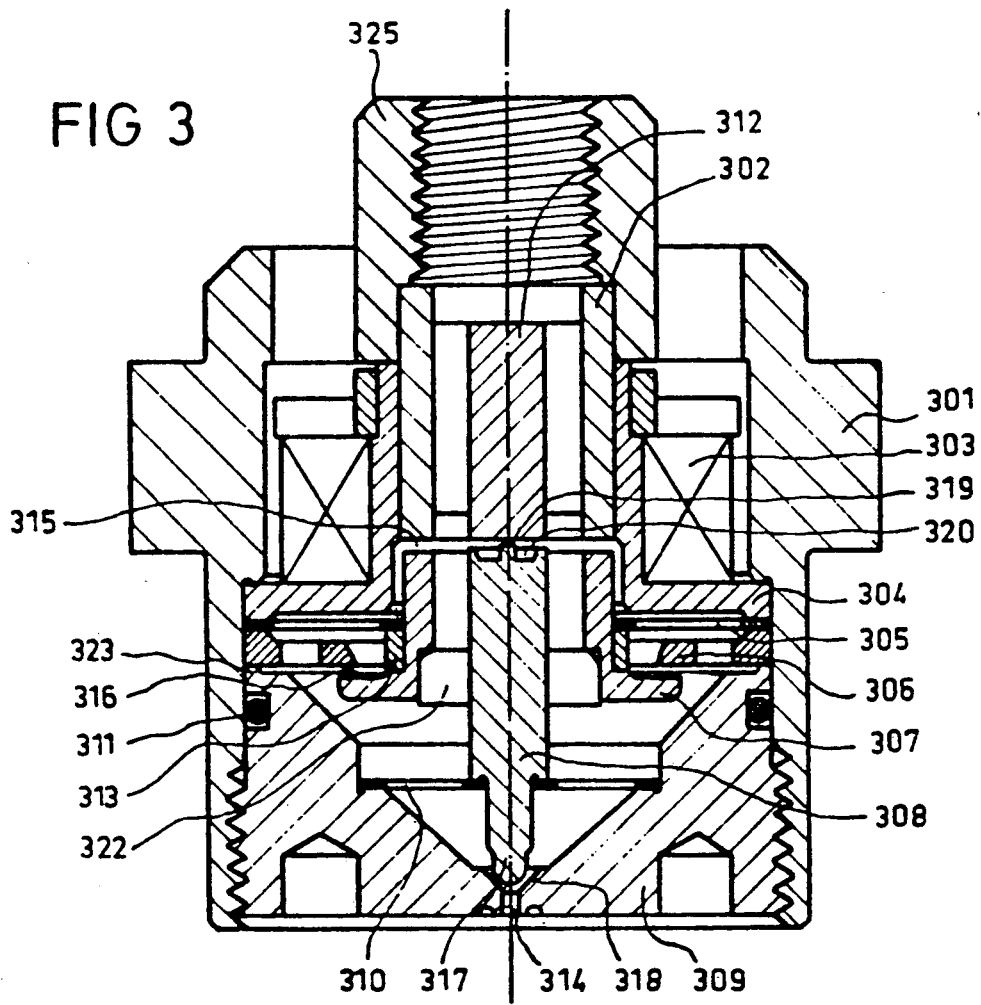
FIG. 3 is a longitudinal-sectional view of a valve having a magnetic circuit with a double air gap.

FIG. 3 illustrates a further high-pressure injection valve, having a magnetic circuit which has a double air gap. The outside diameter of the valve is about 20 mm The magnetic circuit of the valve includes an armature 307, a central pole 302, a housing 301 and a lateral pole 306. The magnetic circuit has two air gaps 315 and 316. The central air gap 315 is disposed within a magnet coil 303. The outer diameter of the central pole 302 is about 6-8 mm. The wall thickness of the central pole 302 is about 0.8-1.2 mm. The area of each of the two magnet poles is about 15-20 $mm^2$. With the armature 307 attracted, a residual air gap which in each case is about 0.05 mm remains in the region of the air gaps 315 and 316. The valve stroke is preferably about 0.05–0.1 mm. The magnet coil 303 is wound onto a coil former 304 of non-magnetizable material. The coil former 304 serves for sealing off the coil space and can, for example, be formed of austenitic steel or high strength ceramic. In order to seal and to improve the mechanical stability, the coil space can be filled with a sealing compound. The magnet coil 303 can furthermore also be manufactured from a thin foil. A foil coil of this kind has a very high mechanical and electrical stability, with the result that it is then also possible to dispense with sealing off the coil space from the system pressure. A valve needle 308 has a lateral collar 322, on which the armature 307 is secured. The entire moved mass of the armature 307 and of the valve needle 308 together amounts to about 1 g. The diameter of the valve needle 308 is about 2–2.5 mm. Machined into the valve needle 308 is a spherical pin 317 which closes the valve seat. The diameter of this pin 317 is about 0.8 mm. The non-pressure-balanced area of the valve seat 318 is about 0.3 $mm^2$. The selected pressure of the valve is about 500 bar. Machined into the upper surface of the valve needle 308 is a stop pin 319, having a diameter which is about 0.5–0.8 mm. The stop pin 319 is surrounded by a damping chamber 320. The stop pin 319 comes to rest against a central stop 312 when the armature 307 is attracted. The central stop 312 is formed of non-magnetizable material and is secured within the magnet pole 302, for example, by hard soldering. The valve needle 308 is braced between two diaphragm springs 305 and 310 and is guided by these springs with slight play in the radial direction. The diaphragm springs 305 and 310 are provided with openings in order to permit the passage of fuel. Disposed between the armature 307 and the upper diaphragm spring 305 is a vibration damper 313. By selecting a suitable thickness of the vibration damper 313, it is possible to adjust the force of the return spring. A further non-illustrated vibration damper can be disposed between the lower diaphragm spring 310 and the valve needle 308. The coil former 304, the diaphragm spring 305 and the lateral pole 306 are braced firmly within the housing 301 by a seat base 309. In the region of a sealing-ring groove 311, the seat base 309 is of resilient construction, thereby permitting calibration of the valve stroke by screwing-in the seat base 309 to an appropriate depth. Fuel is fed to the valve seat 318 through a central connection piece 325 on the housing 301, through lateral grooves in the central stop 312 and in the collar 322 of the valve needle 308 and furthermore through openings in the diaphragm springs 305 and 310. FIG. 3 also shows a nozzle 314 and an air gap 323.

The advantage of the present valve structure over the valve structures according to FIG. 1 and FIG. 2 lies in reduced formation of eddy currents, since the magnetic circuit can be of thinner-walled construction for a specified maximum magnetic force.

Furthermore, a lower armature mass is obtained, so that even quicker armature movements are thereby possible. The valve has a self-centering ability, so that it is possible to compensate slight inaccuracies in manufacture. However, the increased number of possible leakage current paths is disadvantageous as compared to the illustrative embodiments according to FIG. 1 and FIG. 2.

Figure 4:
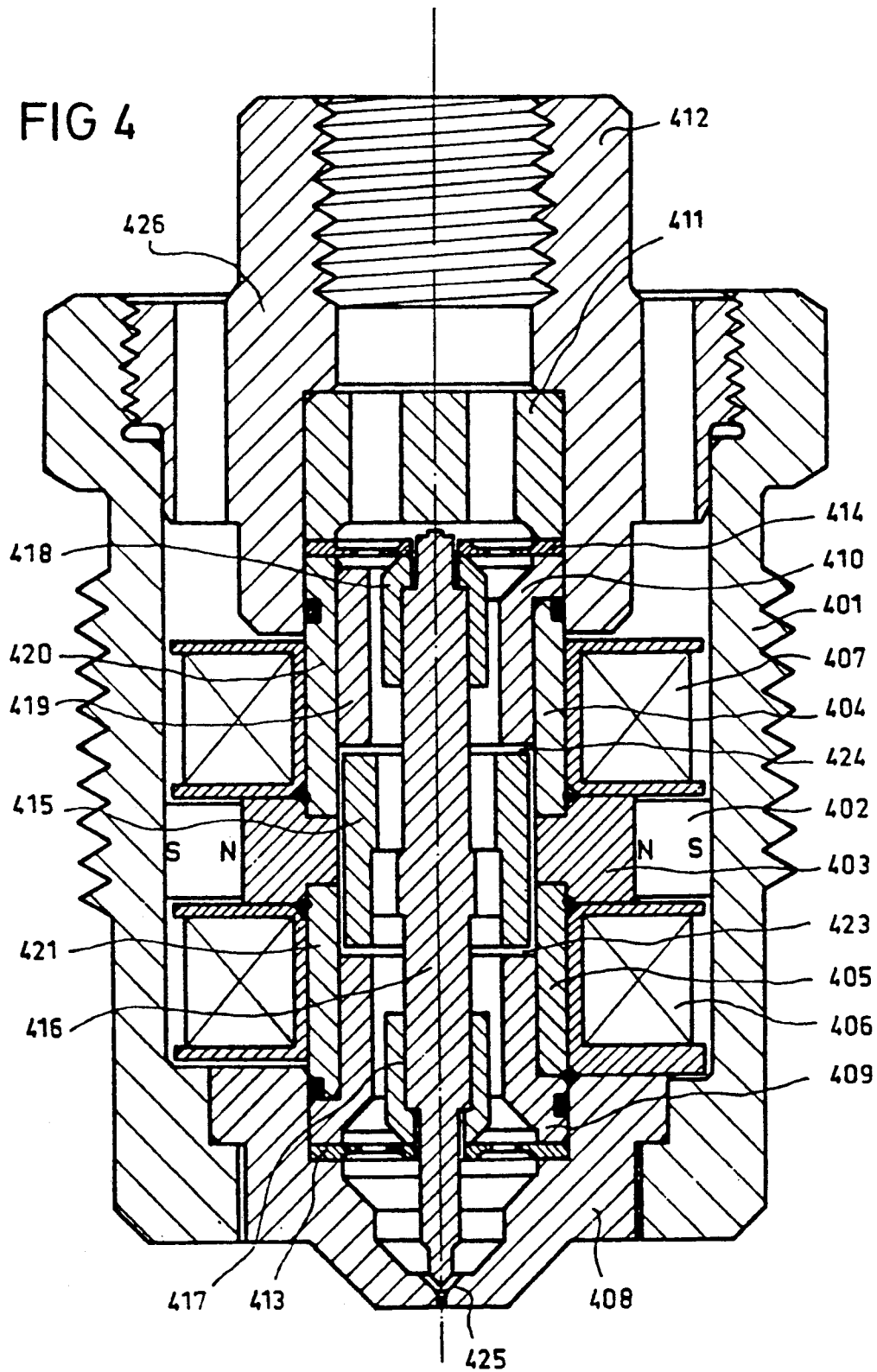
FIG. 4 is another longitudinal-sectional view of a valve having a polarized magnetic circuit.

FIG. 4 depicts a high-pressure injection valve with a polarized magnetic circuit. The basic structure of the polarized magnetic circuit is known. The selected pressure of the valve is about 1000 bar. The outside diameter of the valve is about 22 mm. The valve permits the quickest actuating movements in comparison with valve structures according to FIGS. 1 to 3. However, a considerably increased expenditure in terms of construction is a disadvantage of the FIG. 4 embodiment.

In FIG. 4, a monostable valve structure is depicted on the left-hand side and a bistable valve structure on the right-hand side. In this context, a monostable structure is understood to mean a valve which automatically moves into the closed position after the excitation current is switched off. The monostable structure offers the advantage of increased reliability in the event of any malfunctions in the electric control circuit. In a bistable structure, an electric counterpulse is required for closing the valve. The bistable structure offers the advantage of better efficiency and therefore a higher working speed. A special feature of the valve depicted in FIG. 4 is a frictionless suspension of the armature between two diaphragm springs with a very steep elasticity characteristic. In the half-opened position of the valve, the spring force is zero. The maximum of the spring force is reached in the respective end positions of the valve, both in the open and in the closed position. In order to achieve the maximum possible efficiency, the spring force in the closed position of the valve should correspond approximately to the sum of the permanent-magnetic force of the magnetic circuit and the closing force required for safety reasons. With a steep elasticity characteristic, considerably quicker actuating movements can be achieved in injection valves with polarized magnetic circuits than with the customary gentle elasticity characteristics. Gentle elasticity characteristics would be obtained if helical springs were used. The valve is suitable for a fuel pressure of up to about 1000 bar.

The polarized electromagnetic valve according to FIG. 4 has a tubular armature 415, which is firmly connected to a valve needle 416. The outside diameter of the armature 415 is preferably 7–8 mm. The wall thickness of the armature is preferably about 0.8–1.2 mm. The total mass of the armature 415 and the valve needle 416 is about 1.5 g. The valve needle 416 is suspended at the top and bottom in diaphragm springs 413 and 414. The calibration of the characteristic of the diaphragm springs 413 and 414 is effected by appropriate grinding of the flat side of these springs. Disposed between the diaphragm springs 413 and 414 and the valve needle 416 are vibration dampers 417 and 418. The diaphragm springs 413 and 414 are provided with openings which permit the passage of fuel. The armature stroke is limited by an upper stop 411, against which the valve needle 416 comes to rest when the valve is open.

The two magnet poles of the valve are disposed within non-magnetizable sleeves. The bistable valve on the right-hand side of FIG. 4 has a magnetically symmetrical structure. In this case lower and upper air gaps 423 and 424 are disposed only between the armature 415 and the two magnetic poles 409 and 410. In the monostable valve structure on the left-hand side of FIG. 4, an additional air gap is formed between an upper magnet pole 419 and a closure plug 426 by a non-magnetizable sleeve 420. This additional air gap weakens the magnetic field within the upper air gap 424. This ensures the automatic return of the armature 415 into the rest position due to the stronger magnetic field in the region of the lower air gap 423. In the respective end position, the residual upper and lower air gaps 423 and 424, each of which is preferably about 0.05 mm, remain between the armature 415 and the magnet poles. The residual air gaps are necessary in order to avoid hydraulic sticking. A desired hydraulic damping of the actuating movements is furthermore achieved in the region of the residual air gaps. A monostable mode of operation can also be achieved by an asymmetrical configuration of the residual air gaps 423 and 424. For this purpose, the upper residual air gap 424 is of considerably longer construction than the lower residual air gap 423, with the result that a correspondingly stronger permanent-magnetic field is formed in the region of the lower residual air gap 423, bringing about the automatic return. However, the monostable configuration, depicted on the left-hand side of FIG. 4, with an additional magnetic air gap between the pole 419 and the closure plug 426 is more advantageous magnetically.

The permanent-magnetic field is produced by a permanent magnet 402, which can be constructed of a plurality of separate segments. The inner magnetic return path to the armature 415 is accomplished through a central pole 403. The outer magnetic return path to the two magnet poles 409 and 410 is effected through a valve housing 401, an upper closure plug 412 and a seat base 408 having a valve seat 425. The central pole 403 is firmly connected to non-magnetizable sleeves 404 and 405, 421 or 420. They are preferably connected by a laser weld or by hard soldering. The electrical excitation is effected by two magnet coils 406 and 407. The internal parts of the valve are jointly firmly braced to the upper closure plug 412 in the valve housing 401. The interior space of the valve is subjected to the full system pressure. Installation spaces for the magnet coils 406 and 407 are sealed off from the system pressure.

In conclusion, it should be noted that the valve according to the invention can also be provided with a shape of the nozzle which differs from the simple shape depicted. These different nozzle shapes are known from the conventional mechanical injection nozzles. These nozzle shapes that are known per se can be used without problems in miniaturized form in the valve according to the invention. In order to improve atomization, the valve can, for example, be equipped with a miniaturized pintle nozzle, in which case the pintle diameter should then be about 0.5–0.7 mm. Atomization can furthermore be improved by very short nozzles with a length of less than 0.5 mm. In order to improve the mechanical strength of such a nozzle, its outlet can be countersunk. The use of such short nozzles is made possible in the valve according to the invention due to the low mechanical loading in the region of the seat. On the combustion-chamber side, the nozzle can furthermore be provided with a rounded portion with a radius of a few hundredths of a millimeter or with a conical outlet, so that atomization is likewise improved and a larger spray cone is achieved. Swirl elements for the production of a fuel swirl can be disposed within the injection nozzle or on the valve needle. It is furthermore possible for a blind hole to be disposed below the valve seat. The hole supplies one or more obliquely disposed nozzles with fuel. A change in the direction of the spray is thereby possible. However, the quality of flow in the inflow region of the nozzle is considerably worsened by the blind hole, always resulting overall in a considerable worsening of the dynamic properties of the valve. If possible, blind holes below the valve seat should therefore be dispensed with in the valve according to the invention.

Although the dimensionings and connection methods indicated above are particularly expedient within the framework of the claims, they are to be taken merely as examples. Press-in connections can, for example, be replaced by screw-in connections. Given the dimensionings indicated above, slightly different dimensions will frequently be necessary if the selected pressure is different. Special installation conditions may also make different shapes of the housing necessary. Such simple modifications can easily be carried out by a person skilled in the art.

It should furthermore be noted that the valve according to the invention could theoretically also be equipped with a collar-shaped stop which partially surrounds the valve needle. The collar-shaped stop can have one or more separate stop regions in uniform radial distribution. In order to ensure the ability to function, the stop surface of such a stop would merely have to be of sufficiently small construction. Such a shape of a stop is common knowledge from the field of low-pressure injection valves. However, in the case of a collar-shaped stop, there are exceptionally great difficulties in maintaining exact parallelism of the stop surfaces. The maintenance of the required parallelism is virtually impossible even with very precise machining methods. In practice, therefore, the hydraulic sticking forces which are produced in such a high-pressure injection valve with a collar-shaped stop frequently exhibit large fluctuations with time, resulting in impermissible, greatly fluctuating closing times of the valve. Such an embodiment gives rise to a large number of rejects during manufacture. In the high-pressure injection valve according to the invention, the structural shape proposed herein with a single central stop will therefore always be preferred.

Further expedient constructions and variants of the fuel injection valve according to the invention can be taken from the claims. The inserted reference numerals are only intended to serve for clarification and are not to be understood as a limitation on the claims. The first digit of the reference numerals indicates the corresponding drawing number.

I claim:

1. An electromagnetic high-pressure injection valve for direct injection of fuel into a combustion chamber of an internal combustion engine, comprising a central valve axis, an electromagnet having an armature being completely surrounded by fuel under high pressure, a needle-shaped valve-closing body being firmly connected to said armature and having a non-pressure-balanced cross-section, a valve seat, a stop element having a stop surface being intersected by the central valve axis defining a contact area between said armature and said stop surface, said valve-closing body and said armature having a total mass of at most substantially 2.5 g, said valve-closing body being displaceable together with said armature along the central valve axis with a displacement being limited by said valve seat and by said stop element, and both said contact area and said non-pressure-balanced cross-section when said valve-closing body rests on said valve seat each being less than substantially 1 mm$^2$.

2. The injection valve according to claim 1, wherein the total mass of said valve-closing body and said armature is substantially from 1 to 2.5 g.

3. The injection valve according to claim 1, wherein said contact area and said non-pressure-balanced cross-section when said valve-closing body rests on said valve seat are each substantially from 0.2 to 0.5 mm$^2$.

4. The injection valve according to claim 1, including a valve housing, a valve seat base being braced relative to said valve housing, said valve seat base having a thread with a given thread diameter and a collar-shaped deformable region being braced mechanically relative to said valve housing, said valve seat base being screwed to said valve housing to a variable depth for adjusting an armature stroke, and said valve seat base having an encircling groove formed therein with an inside diameter being smaller than said given thread diameter and delimiting said collar-shaped deformable region.

5. The injection valve according to claim 1, including a vibration damper for damping a closing rebound of said valve-closing body being exposed to the full fuel pressure, a return spring exerting a force pressing said valve-closing body onto said valve seat, said valve-closing body having a valve needle, a further vibration damper clasping said valve needle, an additional spring exerting a force opposed to the force of said return spring for pressing said further vibration damper against said valve needle, the force of said additional spring being a fraction of the force of said return spring, and said further vibration damper having a mass being a fraction of the mass of said armature and said valve needle.

6. The injection valve according to claim 5, wherein the spring force of said additional spring is substantially 10% of the force of said return spring, and said vibration damper has a mass being substantially 10 to 20% of the mass of said armature and said valve needle.

7. The injection valve according to claim 1, including a permanent magnet having a permanent-magnetic force, a polarized magnetic circuit including said armature for rapid valve actuation with an armature stroke of less than substantially 0.3 mm, and at least two springs between which said armature is suspended, said at least two springs having a steep elasticity characteristic and mutually opposed spring forces defining a resulting spring force in respective end positions being opposed to the permanent-magnetic force, and defining a resulting spring force in an intermediate position of said armature being zero and reaching extreme values in respective end positions of said armature.

8. The injection valve according to claim 7, wherein the armature stroke is substantially 0.1 mm.

9. The injection valve according to claim 1, including a magnet pole, and a non-magnetizable sleeve supporting said magnet pole and radially guiding said armature.

10. The injection valve according to claim 1, including a magnetic circuit having an air gap, a magnet coil in which said air gap is disposed, and said armature being tubular.

11. The injection valve according to claim 1, including a magnetic circuit having an air gap, a magnet coil in which said air gap is disposed, and said armature being hat-shaped.

12. The injection valve according to claim 10, including at least one diaphragm spring radially guiding said armature.

13. The injection valve according to claim 11, including at least one diaphragm spring radially guiding said armature.

14. The injection valve according to claim 1, wherein said armature has a pole surface, and said valve-closing body has a valve needle with a pin-shaped stop projecting above said pole surface by substantially from 30 to 100 micrometers.

15. The injection valve according to claim 1, wherein said armature has a pole surface, and said valve-closing body has a valve needle with a spherical stop projecting above said pole surface by substantially from 30 to 100 micrometers.

16. The injection valve according to claim 1, including a valve needle of said valve-closing body, and a vibration damper being supported by said valve needle and disposed between said return spring and said valve needle.

17. The injection valve according to claim 1, including an injection nozzle, said valve-closing body having a valve needle with a pintle projecting through said injection nozzle and having a diameter of substantially from 0.4 to 0.7 mm.

* * * * *